United States Patent [19]

Bock et al.

[11] Patent Number: 4,585,810

[45] Date of Patent: Apr. 29, 1986

[54] DRAG REDUCTION AGENT

[75] Inventors: Jan Bock; Ralph M. Kowalik, both of Bridgewater; Paul L. Valint, Asbury, all of N.J.

[73] Assignee: Exxon Research and Engineering Co., Florham Park, N.J.

[21] Appl. No.: 626,669

[22] Filed: Jul. 2, 1984

Related U.S. Application Data

[63] Continuation-in-part of Ser. No. 454,279, Dec. 29, 1982, abandoned.

[51] Int. Cl.⁴ .............................................. B05D 5/08
[52] U.S. Cl. .................................. 523/175; 525/271; 525/314
[58] Field of Search ...................... 523/175, 454, 279; 525/271, 314

[56] References Cited

U.S. PATENT DOCUMENTS

| | | | |
|---|---|---|---|
| 3,231,635 | 1/1966 | Holden et al. | 525/271 |
| 3,748,266 | 7/1973 | Malone et al. | 137/13 |
| 3,925,280 | 12/1975 | Lundberg et al. | 525/504 |
| 4,190,069 | 2/1980 | Krantz | 137/13 |

Primary Examiner—Jacob Ziegler
Attorney, Agent, or Firm—Richard E. Nanfeldt

[57] ABSTRACT

The present invention relates to drag reduction agents for water which are diblock polymers of t-butylstyrene/metal styrene sulfonate and triblock polymers of t-butylstyrene/metal styrene sulfonate/t-butylstyrene.

2 Claims, 3 Drawing Figures t-BUTYLSTYRENE - STYRENE DIBLOCK POLYMER SYNTHESIS

SULFONATION OF t-BUTYLSTYRENE-STYRENE BLOCK POLYMERS

DRAG REDUCTION AGENT

CROSS-REFERENCE TO RELATED APPLICATIONS

This application is a continuation-in-part of U.S. Ser. No. 454,279, filed Dec. 29, 1982, abandoned.

FIELD OF THE INVENTION

To flow liquids in pipes, energy must be expended to overcome frictional losses. This energy is extracted from the liquid pressure, which decreases along the pipe in the direction of flow. For the fixed pipe diameter, these pressure drops increase with increasing flow rate until a maximum is reached when the pressure drop along the pipe equals the supply pressure at the beginning of the pipe. When flow in the pipe is turbulent (flow Reynolds number = mean fluid velocity × pipe diameter ÷ fluid kinematic viscosity greater than about 2000) this maximum flow rate can be increased by the addition of small amounts of certain high molecular weight linear polymers to the liquid. These polymers interact with the turbulent flow processes and reduce frictional pressure losses such that the pressure drop for a given flow rate is less, or the maximum flow rate for a given pressure drop is larger. This phenomenon is commonly called drag reduction. It has been used in commercial oil pipelines, fire hoses and storm sewers to increase the flow capacities of existing systems. It can also be used to reduce supply pressures, pumping costs, and/or pipe diameters for given flow capacities.

BACKGROUND OF THE INVENTION

The present invention discloses a class of water soluble block polymers of relatively low molecular weight, which have been found to be improved drag reducing agents. These polymers have a water soluble block and a hydrocarbon soluble block. For aqueous solubility, the water soluble block is greater than 80 weight percent of the total polymer. One method of preparing the block polymers is to anionically polymerize a hydrocarbon soluble block polymer. This is followed by the selective functionalization of the major block to render said block water soluble. The functionalization in this invention is sulfonation followed by neutralization of the resulting sulfonic acid. These block polymers readily dissolve in water. The resulting solutions are improved drag reducing agents for aqueous systems at low concentrations (i.e., 10 to 500 ppm) relative to solutions of homopolymers of even higher molecular weight.

Numerous U.S. Patents have taught methods of sulfonating a variety of elastomeric and thermoplastic polymers. These U.S. Pat. are Nos. 3,642,728; 3,836,511; 3,072,618; 3,072,619; 3,847,854; 3,870,841 and 3,877,530. However, none of these references teach the process for preparing the sulfonated diblock and triblock polymers of the instant invention, nor do they recognize that sulfonated polymers of this class are effective drag reducing agents for aqueous solutions.

SUMMARY OF THE INVENTION

The present invention relates to a method for reducing the frictional drag of an aqueous solution in flow through pipes having a continuous bore therethrough, which method comprises adding a quantity of water soluble sulfonated triblock polymers of t-butylstyrene/metal styrene sulfonate/t-butylstyrene, or water soluble diblock polymers of t-butylstyrene/metal styrene sulfonate, to the aqueous solution, wherein the diblock polymers of t-butylstyrene/styrene or the triblock polymers of t-butylstyrene/styrene/t-butylstyrene are formed by an anionic polymerization process and the formed diblock or triblock polymer is selectively sulfonated on the styrene blocks. The diblock polymers of t-butylstyrene/metal styrene sulfonate or the triblock polymers of t-butylstyrene/metal styrene sulfonate/t-butylstyrene are effective drag reducing agents for aqueous solutions. The quantity of water soluble sulfonated diblock or triblock polymer added to the aqueous solution is about 10 to about 1000 ppm of water, more preferably about 10 to about 500 and most preferably about 10 to about 100.

GENERAL DESCRIPTION OF THE INVENTION

The present invention relates to a method for reducing the frictional drag of an aqueous solution in flow through pipes having a continuous bore therethrough, which method comprises adding a quantity of water soluble sulfonated triblock polymers of t-butylstyrene/metal styrene sulfonate/t-butylstyrene, or water soluble diblock polymers of t-butylstyrene/metal styrene sulfonate, to the aqueous solution, wherein the diblock polymers of t-butylstyrene/styrene or the triblock polymers of t-butylstyrene/styrene/t-butylstyrene are formed by an anionic polymerization process and the formed diblock or triblock polymer is selectively sulfonated on the styrene blocks. The quantity of water soluble sulfonated diblock or triblock polymer added to the aqueous solution is about 10 to about 1000 ppm of water, more preferably about 10 to about 500 and most preferably about 10 to about 100. The water soluble diblock polymers of t-butylstyrene/metal styrene sulfonate, triblock polymers of t-butylstyrene/metal styrene sulfonate/t-butylstyrene are formed by the selective sulfonation of the styrene block of the diblock polymer of t-butylstyrene/styrene or triblock polymer of t-butylstyrene of styrene/t-butylstyrene. These diblock or triblock polymers are formed by the anionic polymerization of styrene monomer and t-butylstyrene. The process of forming the diblock copolymers of t-butylstyrene/styrene and the triblock polymers of t-butyl styrene/styrene and the triblock polymers of t-butyl styrene/styrene/t-butylstyrene is based on a synthetic reaction sequence to form the block polymers of t-butylstyrene-b-styrene sulfonate by means of an anionic polymerization of t-butylstyrene followed by the addition of styrene monomer to continue polymerization on the living anion polymer. All polymerizations were initiated with sec-butyl lithium to form the t-butylstyrene anion. Additional t-butylstyrene was added for the desired chain length of that block followed by the addition of styrene only for diblock polymer preparation. Chain termination was accomplished by the addition of an alcohol to the reaction mixture to protonate the chain and anionic functionality. The overall reaction sequence for the diblock polymer synthesis is illustrated in FIG. 1.

The preparation of triblock polymer with end blocks of t-butylstyrene was done sequentially, again, starting with initiation of t-butylstyrene polymerization by sec-butyl lithium. After addition of styrene to form the midblock, t-butylstyrene monomer was again added to the living polymer chain to complete the triblock polymer synthesis as schematically presented in FIG. 2.

The present polymerization process for preparing the diblock polymers of t-butylstyrene/styrene comprises the steps of forming a t-butylstyrene anion by initiation of t-butylstyrene monomer with sec-butyl lithium; adding additional t-butylstyrene to t-butylstyrene anion to obtain the desired chain length of the t-butylstyrene block; adding styrene to the living anion polymer of t-butylstyrene until the desired chain length of the styrene block has been achieved; and terminating the polymerization by the addition of alcohol.

The polymerization process for preparing the triblock polymers of t-butylstyrene/styrene/t-butylstyrene comprises the additional step of adding additional t-butylstyrene to the living anion of the t-butylstyrene/styrene polymer prior to chain termination by an alcohol.

The diblock polymers of t-butylstyrene/styrene are represented by the formula:

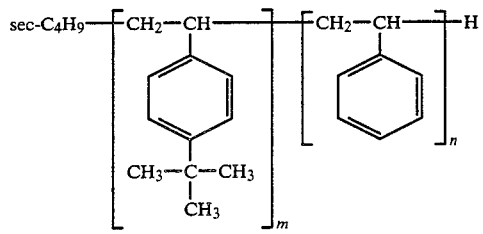

wherein m is about 0.5 to about 15.0 mole%, more preferably about 1.0 to about 12.0 mole %, and most preferably about 2.0 to about 12.0 mole %, and n is about 85.0 to about 99.5 mole %, more preferably about 88.0 to about 99.0 mole %, and most preferably about 88.0 to about 98.0 mole %. The molecular weight, as determined by gel permeation chromatography, for these diblock polymers of t-butylstyrene/styrene is about 100,000 to about 3,000,000, more preferably about 200,000 to about 2,000,000 and most preferably about 400,000 to about 1,000,000.

The triblock polymers of t-butylstyrene/styrene/t-butylstyrene are represented by the formula:

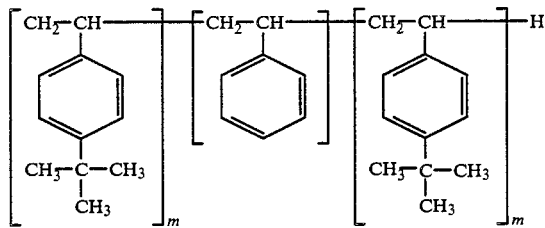

wherein m is about 0.25 to about 7.5 mole %, more preferably about 0.5 to about 6.0 mole %, and most preferably about 1.0 to about 6.0 mole %, and n is about 85.0 to about 99.5 mole %, more preferably about 88.0 to about 99.0 mole %, and most preferably about 88.0 to about 98.0 mole %. The molecular weight, as determined by gel permeation chromotography, for these triblock polymers of t-butylstyrene/styrene/t-butylstyrene is about 100,000 to about 3,000,000 more preferably about 200,000 to about 2,000,000 and most preferably about 400,000 to about 1,000,000.

The diblock polymers of t-butylstyrene/styrene or the triblock polymers of t-butylstyrene/styrene/t-butylstyrene are sulfonated according to schematic sequence as illustrated in FIG. 3.

In carrying out the invention, the polymer is dissolved in a non-reactive solvent such as a chlorinated aliphatic hydrocarbon, or chlorinated aromatic such as dichloroethane. A sulfonating agent is added to the solution of the polymer and non-reactive solvent at a temperature of about $-100°$ C. to about $100°$ C. for a period of time of about 1 to about 60 minutes, more preferably at room temperature for about 5 to about 45 minutes; and most preferably about 15 to about 30. Typical sulfonating agents are described in U.S. Pat. No. 3,642,728, incorporated herein by reference. These sulfonating agents are a complex of a sulfur trioxide donor and a Lewis base containing oxygen, sulfur, or phosphorus. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene, or triethylphosphate. The most preferred sulfonation agent for this invention is a complex of $SO_3$ with triethylphosphate.

Neutralization of the acid form of the diblock or triblock polymer is done by the addition of a solution of a basic material to a solution of the unneutralized, sulfonated diblock or triblock polymer. Suitable neutralizing agents are selected from metal hydroxides, metal acetates or metal alkoxides, wherein the metal cation is selected from the group consisting of iron, aluminum, lead, Groups IA, IB, IIA and IIB of the Periodic Table of Elements, wherein the sodium ion is preferred. The preferred neutralizing agents are an aqueous solution of sodium hydroxide or a solution of sodium methoxide in methanol.

The present invention relates to a method for reducing the frictional drag of aqueous solution in flow through pipes or conducts having a continuous bore therethrough which comprises adding about 10 to about 1000 ppms of a water soluble sulfonated diblock or triblock polymer to said aqueous solution, said diblock polymer having the formula:

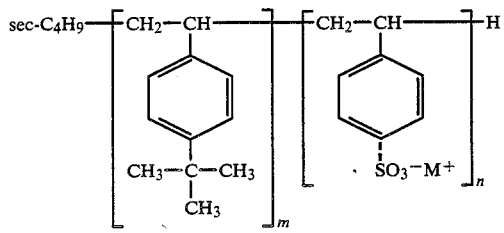

wherein m is about 0.5 to about 15 mole %, n is about 85.0 to about 99.5 mole %, and M is selected from the group consisting of hydrogen, and metal ions of iron, aluminum, lead, and Groups IA, IIA, IB and IIB of the Periodic Table of Elements, and said triblock polymer having the formula:

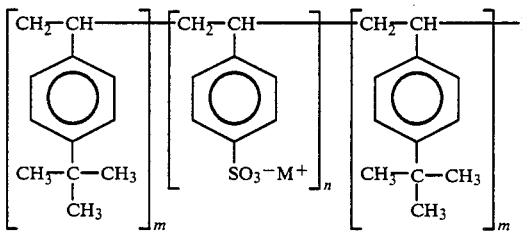

wherein m is about 0.25 to about 7.5 mole %, n is about 85 to about 99.5 mole % and M is selected from the group consisting of hydrogen, iron, aluminum, lead and Groups IA, IIA, IB and IIB of the Periodic Table of Elements wherein M can be sodium.

DESCRIPTION OF THE PREFERRED EMBODIMENTS

Figure 1:
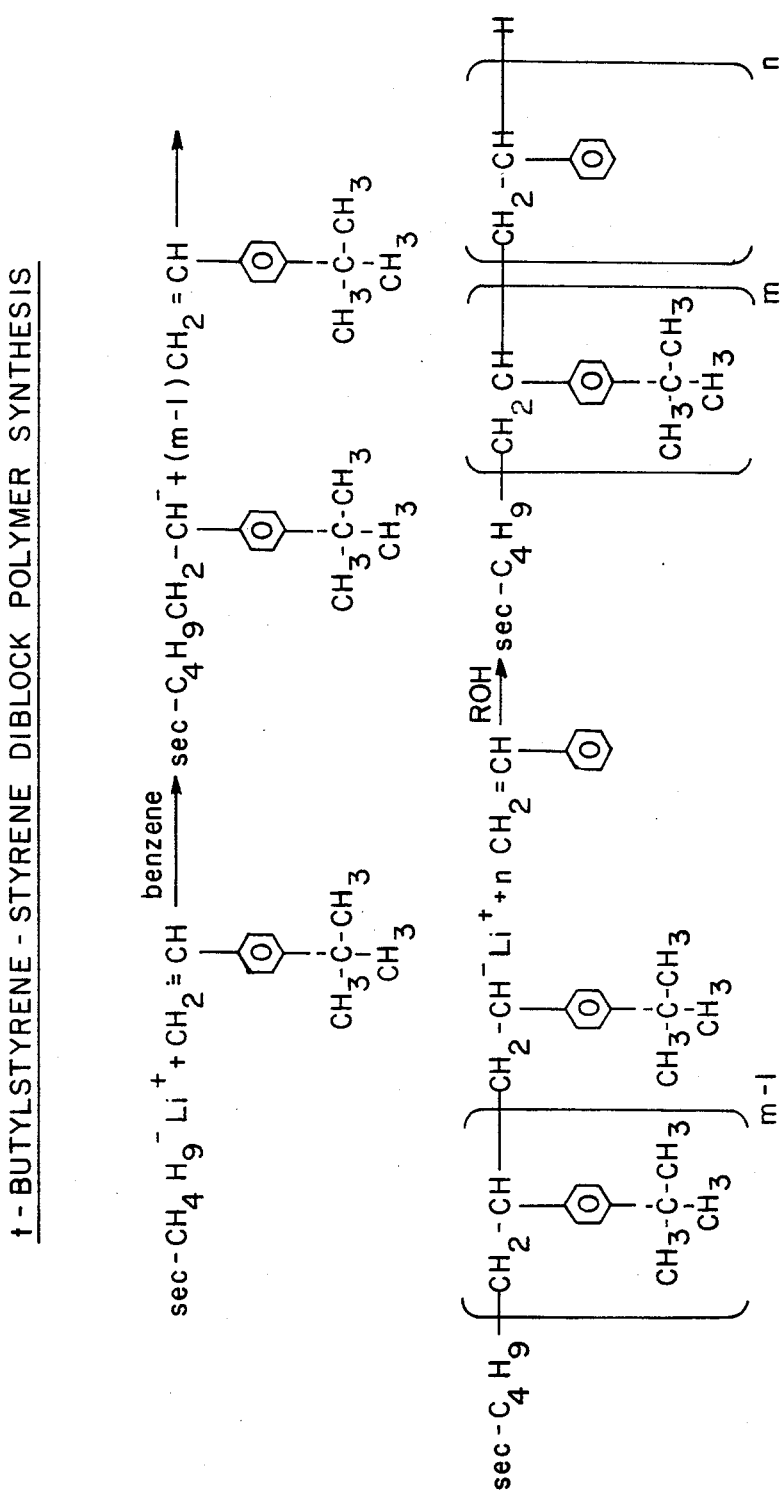
FIG. 1 illustrates a schematic of the preparation of a diblock polymer of t-butylstyrene/styrene.
Figure 2:
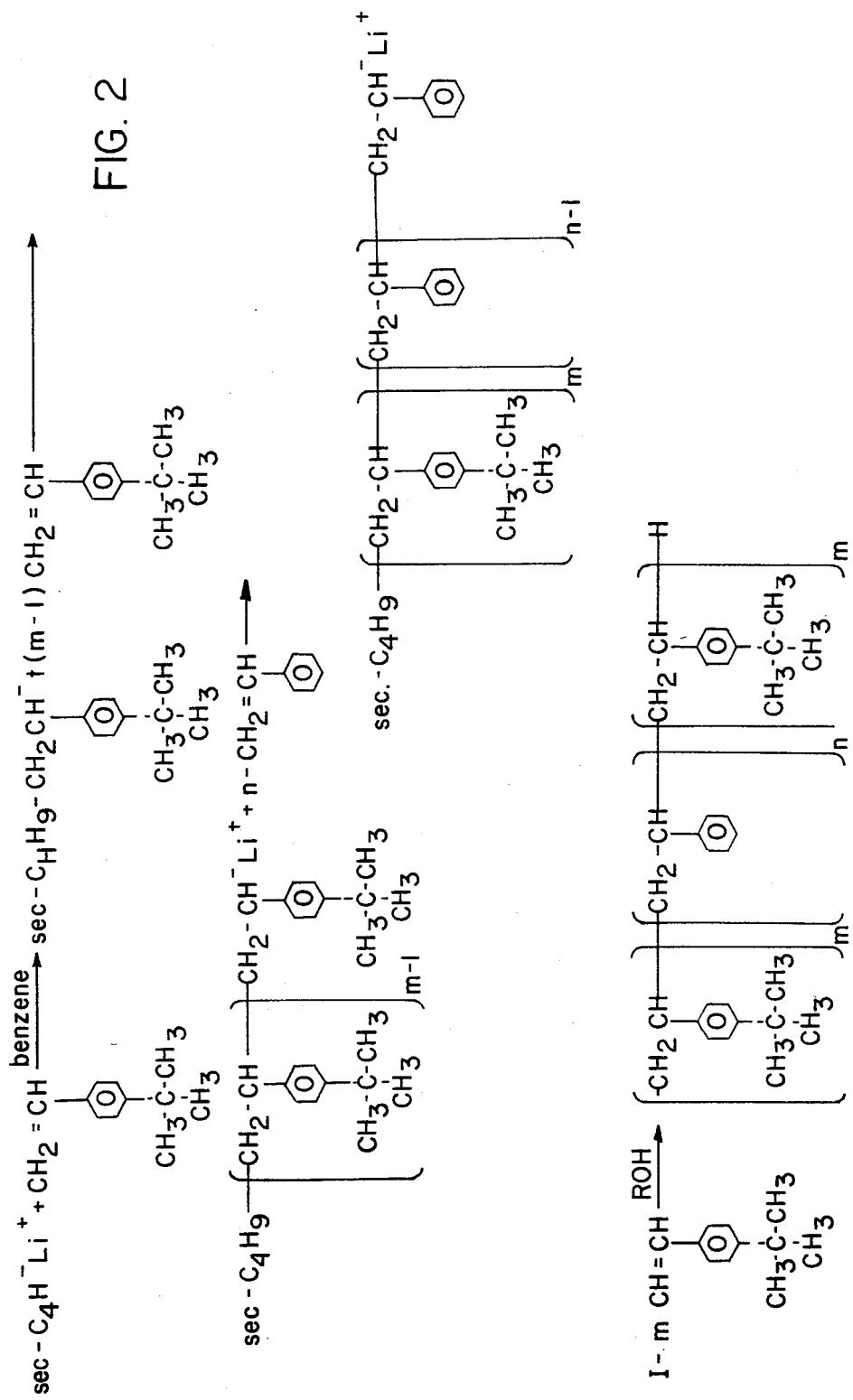
FIG. 2 illustrates a schematic of the preparation of a diblock polymer of t-butylstyrene/metal styrene sulfonate and a triblock polymer of t-butylstyrene/metal styrene sulfonate/t-butylstyrene.
Figure 3:
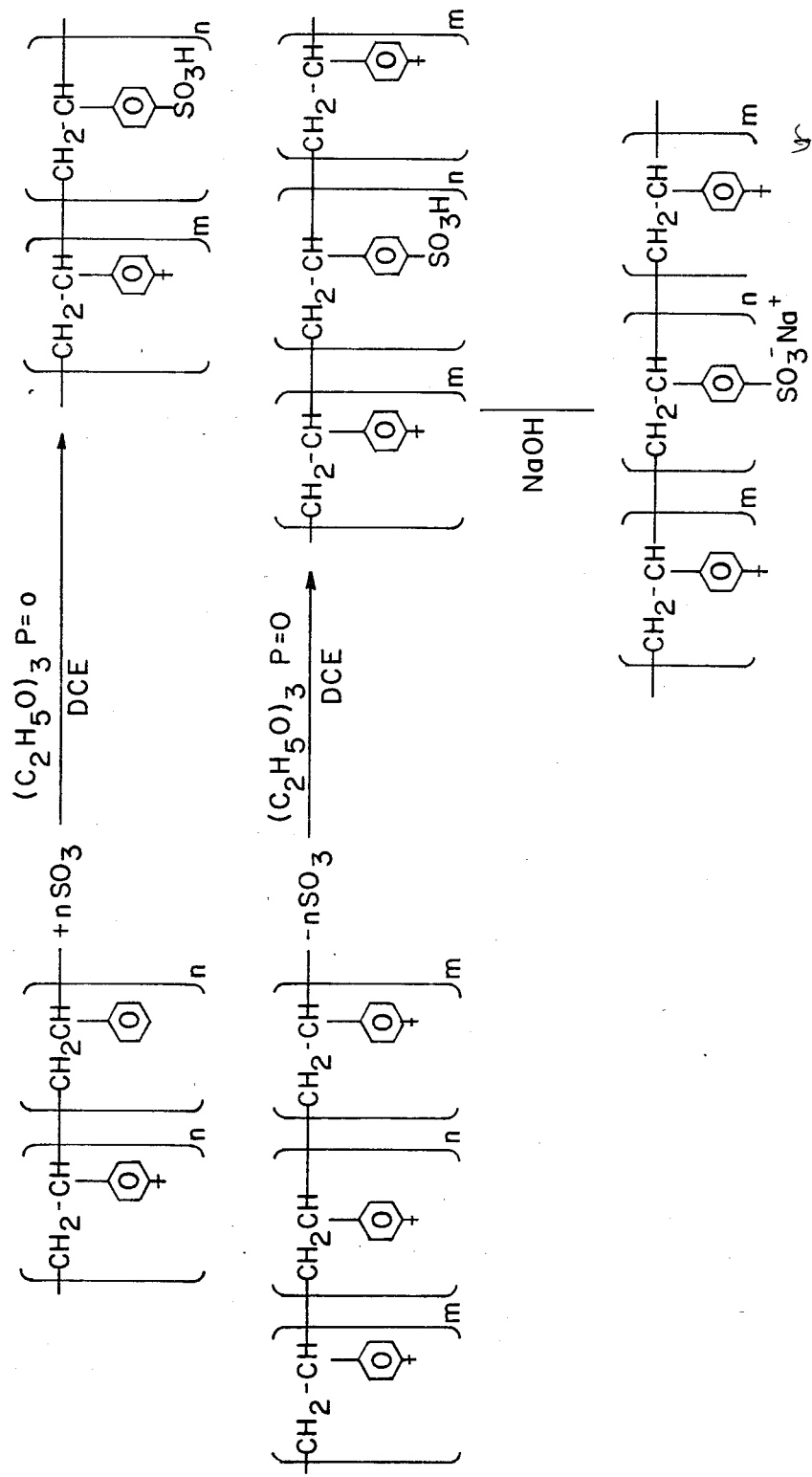
FIG. 3 illustrates a schematic of the preparation of a diblock polymer of t-butylstyrene/metal styrene sulfonate and a triblock of t-butylstyrene/metal styrene sulfonate/t-butylstyrene.

The following examples illustrate the present invention without; however, limiting the same hereto.

EXAMPLE 1

Preparation of Hydrocarbon Soluble Block Prepolymers

The synthetic reaction sequence to the diblock polymers of t-butylstyrene-b-styrene sulfonate began with the anionic polymerization of t-butylstyrene followed by the addition of styrene monomer to continue polymerization on the living anion polymer. All polymerizations were initiated with sec-butyl lithium to form the t-butylstyrene anion. Additional t-butylstyrene was added for the desired chain length of that block followed by the addition of styrene only for diblock polymer preparation. Chain termination was accomplished by the addition of an alcohol to the reaction mixture to protonate the chain and anionic functionality.

The preparation of triblock polymer with end blocks of t-butylstyrene was done sequentially, again, starting with initiation of t-butylstyrene polymerization by sec-butyl lithium. After addition of styrene to form the midblock, t-butylstyrene monomer was again added to the living polymer chain to complete the triblock polymer synthesis. The overall reaction sequences for di and triblock polymer syntheses are presented in detail in U.S. Ser. No. 454,243, filing date 9/29/82.

A number of block polymers were prepared and the compositional data are presented in Table I. The diblock polymer at 5 wt. % t-butylstyrene-95 wt. % styrene (D5-TBS-S) had a weight average molecular weight of $1.0 \times 10^6$. The triblock polymer of composition, 2.5 wt. % t-butylstyrene-95 wt. % styrene-2.5 wt. % t-butylstyrene had a weight average molecular weight of $6.1 \times 10^5$.

EXAMPLE 2

Sulfonation of Block Prepolymers to form Water Soluble Polymers

The sulfonation technique for the preparation of the water soluble sulfonate polymer utilized sulfur trioxide ($SO_3$) complexed with triethyl phosphate (TEP) as the sulfonating agent. The solvent medium was dichloroethane (DCE) chosen because the t-butylstyrene-styrene polymers were soluble, whereas the sulfonated polymers were insoluble in this solvent. This combination of solubility properties allowed for facile isolation of the desired sulfonated polymer that underwent little, if any, cross-linking. With more potent sulfonating agents, such as uncomplexed $SO_3$, cross-linking via sulfone functionality can be a serious consequence resulting in insoluble gel-like polymers. In the sulfonation of the block polymers, only the styrene block was sulfonated, since the preferred para positions of the t-butylstyrene block were already occupied. Also the steric bulk of the t-butyl group effectively inhibits sulfonation of the remaining positions on the substituted aromatic ring. Therefore, after neutralization of the styrene sulfonic acid block to the sodium salt, the polymers then consisted of a hydrophobic block, t-butylstyrene, and a hydrophilic block, sodium styrene sulfonate.

The general sulfonation procedure was to place 0.2 equivalent of triethyl phosphate (TEP) dissolved in dichloroethane (DCE) (2 g. TEP/100 ml. DCE) into a dry reactor fitted with mechanical stirrer, two dropping funnels and a thermometer. The solution was cooled to 0° C. and 1.0 eq. of block polymer dissolved in DCE (5 g. polymer/100 ml. DCE) was placed in a dropping funnel and 1.1 eq. of $SO_3$ in DCE in the other dropping funnel. The $SO_3$ solution followed by polymer solution were added alternately in 10% portions to the reactor while maintaining the temperature at 0° C. The sulfonated polymer precipitated from solution and was isolated by filtration and washed with pentane. The white, granular polymer was then dried under vacuum at room temperature.

The sodium salts of the sulfonated block polymers was prepared by neutralization of the free acid polymer in methanol with aqueous NaOH or with sodium methoxide in methanol to a solution pH of 7.0. The methanolic solutions of the polymers were then evaporated to dryness under vacuum to isolate the sodium salts of the sulfonated polymers. Analytical data are presented in Table II.

EXAMPLE 3

Preparation of Sulfonated Polymers of U.S. Pat. No. 3,925,280

The synthetic reaction sequence to the diblock polymers of t-butylstyrene-b-styrene sulfonate began with the anionic polymerization of t-butylstyrene followed by the addition of styrene monomer to continue polymerization on the living anion polymer. All polymerizations were initiated with sec-butyl lithium to form the t-butylstyrene anion. Additional t-butylstyrene was added for the desired chain length of that block followed by the addition of styrene only for diblock polymer preparation. Chain termination was accomplished by the addition of an alcohol to the reaction mixture to protonate the chain and anionic functionality.

The preparation of triblock polymer with end blocks of t-butylstyrene was done sequentially, again, starting with initiation of t-butylstyrene polymerization by sec-butyl lithium. After addition of styrene to form the midblock, t-butylstyrene monomer was again added to the living polymer chain to complete the triblock polymer synthesis. The overall reaction sequences for di and triblock polymer syntheses are presented in detail in U.S. Ser. No. 454,243, filing date 12/29/82.

The triblock polymer of U.S. Pat. No. 3,925,280 at 80 wt.% t-butylstyrene-20 wt.% styrene (D5-TBS-S) had a weight average molecular weight of $10(10^5)$.

The sulfonation technique for the preparation of the sulfonate polymer of U.S. Pat. No. 3,925,280 utilized sulfur trioxide ($SO_3$) complexed with triethyl phosphate (TEP) as the sulfonating agent. The solvent medium was dichloroethane (DCE) chosen because the t-butylstyrene-styrene polymers were soluble, whereas the sulfonated polymers were insoluble in this solvent. This combination of solubility properties allowed for facile isolation of the desired sulfonated polymer that underwent little, if any, cross-linking. With more potent sulfonating agents, such as uncomplexed $SO_3$, cross-linking via sulfone functionality can be a serious consequence resulting in insoluble gel-like polymers. In the sulfonation of the block polymers, only the styrene block was sulfonated. since the preferred para positions of the t-butylstyrene block were already occupied. Also the steric bulk of the t-butyl group effectively inhibits sulfonation of the remaining positions on the substituted aromatic ring. Therefore, after neutralization of the styrene sulfonic acid block to the sodium salt, the polymers then consisted of a hydrophobic block, t-butylstyrene, and a hydrophilic block, sodium styrene sulfonate.

The general sulfonation procedure was to place 0.2 equivalent of triethyl phosphate (TEP) dissolved in dichloroethane (DCE) (2 g. TEP/100 ml. DCE) into a dry reactor fitted with mechanical stirrer, two dropping funnels and a thermometer. The solution was cooled to 0° C. and 1.0 eq. of block polymer dissolved in DCE (5 g. polymer/100 ml. DCE) was placed in a dropping funnel and 1.1 eq. of $SO_3$ in DCE in the other dropping funnel. The $SO_3$ solution followed by polymer solution were added alternately in 10% portions to the reactor while maintaining the temperature at 0° C. The sulfonated polymer precipitated from solution and was isolated by filtration and washed with pentane. The white, granular polymer was then dried under vacuum at room temperature.

The sodium salts of the sulfonated block polymers was prepared by neutralization of the free acid polymer in menthanol with aqueous NaOH or with sodium methoxide in methanol to a solution pH of 7.0. The methanolic solutions of the polymers were then evaporated to dryness under vacuum to isolate the sodium salts of the sulfonated polymers. This polymer of U.S. Pat. No. 3,925,280 was insoluble in water. Analytical data are presented in Table II.

EXAMPLE 4

Drag Reduction of Novel Copolymers

Drag reduction effectiveness of the sulfonated polymers of Examples 2 and 3 was evaluated by flowing polymer/distilled water solutions through a 2.13 mm inside diameter stainless steel tube and measuring the resulting frictional pressure drop. Flows were generated by first loading a bladder accumulator with a previously dissolved polymer/distilled water solution and then discharging the solution through the tube test section. The bladder accumulator used (Greer-Olaer Model 30A-2½) is a 10 liter pressure vessel which contains an inflatable rubber bladder, a port for loading and discharging gas from the inside of the bladder and a port for loading and discharging liquid solutions from the space between the bladder and the interior vessel walls. To load the vessel with liquid, the bladder was first expanded with nitrogen gas such that the bladder filled the inside of the vessel. The liquid solution was then siphoned into the vessel as the bladder was evacuated. Subsequent charging of the vessel with nitrogen gas produced a flow of liquid which was directed to the 2.13 mm diameter tube. Pressure drops were measured across a 48 cm straight segment of the tube with a pair of flush mounted tube wall pressure taps and a differential pressure transmitter. Flow rates were measured by weighing samples of the effluent liquid collected over measured time periods.

Flow rates in the drag reduction experiments ranged from about 8 to 20 g/s; these correspond to solvent Reynolds numbers from about 5000 to 13000 (solvent Reynolds number=mean flow velocity×tube diameter÷solvent kinematic viscosity). Drag reduction was measured by comparing pressure drops of the polymer/distilled water solutions with pressure drops of the distilled water solvent at equal flow rates. Results were expressed as percent drag reduction which is defined as follows:

$$\text{Percent Drag Reduction} = \frac{\text{Pressure Drop (Solvent)} - \text{Pressure Drop (Solution)}}{\text{Pressure Drop (Solvent)}} \times 100$$

Typical drag reduction results from experiments with the block polymer solutions are given in Table III. Significant drag reduction was observed for all listed solutions. Each solution contained 89 parts per million (by weight) of polymer except that the polymer of Example 3 was insoluble in the water and was a precipitate therein. The water soluble polymers of Example 2 are excellent reduction agents of aqueous solutions whereas the water insoluble polymer of U.S. Pat. No. 3,925,280 is ineffective as a drag reduction agent for an aqueous solution.

TABLE I

COPOLYMER COMPOSITIONAL DATA

| Polymer | Composition, Wt. % (Mole %) | | | Molecular Weight | |
|---|---|---|---|---|---|
| | TBS | Styrene | TBS | $M_w \times 10^{-5}$ | $M_n \times 10^{-5}$ |
| D5-TBS—S | 5 (3.3) | 95 (96.7) | — | 10 | 9.4 |
| T5-TBS—S | 2.5 (1.65) | 95 (96.7) | 2.5 (1.65) | 6.1 | 5.7 |
| Polymer of U.S. Pat. No. 3,925,280 | | 20.0 | 80.0 | | |

TBS—t-butylstyrene

TABLE II

MOLECULAR WEIGHT AND ELEMENTAL ANALYSIS OF SULFONATED POLYMERS

| Polymer | Molecular Weight, $M_n \times 10^{-5}$ | Elemental Analyses | | | | Sulfonation Extent[a] |
|---|---|---|---|---|---|---|
| | | Calc. | | Found | | |
| | | S | Na | S | Na | |
| D5-HBD—SS | 17 | 15.13 | 10.88 | 12.88 | 9.11 | 0.85 |
| T5-TBS—SS | 11 | 15.13 | 10.88 | 15.79 | 10.06 | 1.04 |
| U.S. Pat. | | 3.06 | 2.20 | 1.87 | 1.66 | |

TABLE II-continued

MOLECULAR WEIGHT AND ELEMENTAL ANALYSIS OF SULFONATED POLYMERS

| Polymer | Molecular Weight, $M_n \times 10^{-5}$ | Elemental Analyses Calc. S | Calc. Na | Found S | Found Na | Sulfonation Extent[a] |
|---|---|---|---|---|---|---|
| No. 3,925,280 | | | | | | |

[a]Sulfonation extent, S(Found)/S(Calc.), is a measure of sulfonate groups per styrene unit.

TABLE III

DRAG REDUCTION DATA

| Sample | Hydrophobe Configuration | Type* | Level | Solvent Reynolds Number | Drag Reduction (%) | Water Solubility |
|---|---|---|---|---|---|---|
| Sulfonated D5-HBD—SS | Triblock | TBS | 5% | 10,840 | 23.8 | Soluble |
| Sulfonated T5-TBS—SS | Diblock | TBS | 5% | 10,500 | 7.6 | soluble |
| Sulfonated Polymer of U.S. Pat. No. 3,925,280 | Triblock | TBS | 80% | — | — | insoluble |

What is claimed is:

1. A method for reducing the frictional drag of aqueous solution in flow through pipes or conducts having a continuous bore therethrough which comprises adding about 10 to about 1000 ppms of a water soluble sulfonated diblock or triblock polymer to said aqueous solution, said diblock polymer having the formula:

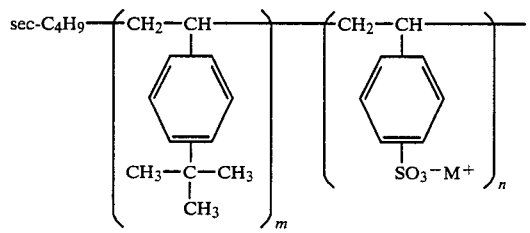

wherein m is about 0.5 to about 15 mole %, n is about 85.0 to about 99.5 mole %, and M is selected from the group consisting of metal ions of iron, aluminum, lead, and Groups IA, IIA, IB and IIB of the Periodic Table of Elements, and said triblock polymer having the formula:

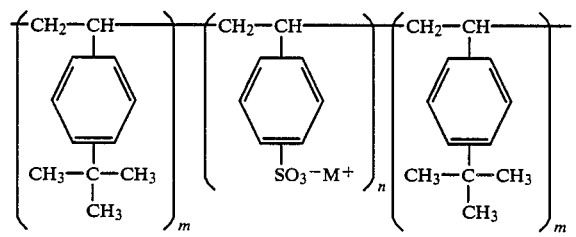

wherein m is about 0.25 to about 7.5 mole %, n is about 85 to about 99.5 mole % and M is selected from the group consisting of iron, aluminum, lead and Groups IA, IIA, IB and IIB of the Periodic Table of Elements.

2. A method according to claim 1 wherein M is sodium.

* * * * *